United States Patent [19]

Trusiani

[11] Patent Number: 5,636,914
[45] Date of Patent: *Jun. 10, 1997

[54] ILLUMINATED PANEL DEVICE

[76] Inventor: Paul J. Trusiani, 7486 La Jolla Blvd. #260, La Jolla, Calif. 92037

[*] Notice: The term of this patent shall not extend beyond the expiration date of Pat. No. 5,369,553.

[21] Appl. No.: 345,255

[22] Filed: Nov. 28, 1994

Related U.S. Application Data

[63] Continuation-in-part of Ser. No. 874,118, Apr. 24, 1992, Pat. No. 5,369,553.

[51] Int. Cl.⁶ .................................................. G09F 13/18
[52] U.S. Cl. ............................ 362/31; 362/26; 362/812
[58] Field of Search ........................... 362/31, 806, 809, 362/812, 26; 40/546, 548, 569; 219/121.72

[56] References Cited

U.S. PATENT DOCUMENTS

| 2,206,866 | 7/1940 | Fuller, Jr. ............................ 362/812 |
| 4,467,168 | 8/1984 | Morgan et al. ...................... 219/121 |
| 4,791,745 | 12/1988 | Pohn ................................... 40/546 |
| 5,369,553 | 11/1994 | Trusiani .............................. 362/31 |

FOREIGN PATENT DOCUMENTS 740794  9/1943  Germany ................................ 40/546

Primary Examiner—Ira S. Lazarus
Assistant Examiner—Y. Quactt
Attorney, Agent, or Firm—Brown, Martin, Haller & McClain

[57] ABSTRACT

An illuminated, flat display panel of light transmitting, acrylic material has a thickness of at least ¼ inch and a plurality of cut-out lines in a predetermined arrangement to form contour edges defining a selected pictorial representation. A lighting unit having at least one light source is secured to the panel so that light is transmitted from the light source through the panel towards the contour edges for reflection from the edges to illuminate the contour edges so that the pictorial representation stands out from the remainder of the panel.

11 Claims, 3 Drawing Sheets

ILLUMINATED PANEL DEVICE

CROSS-REFERENCES TO RELATED APPLICATIONS

This application is a continuation-in-part of application Ser. No. 07/874,118 filed Apr. 24, 19922, now U.S. Pat. No. 5,369,553.

BACKGROUND OF THE INVENTION

The present invention relates generally to pictures for display purposes, such as artistic representations, maps, and other pictorial displays, and is particularly concerned with an illuminated panel device.

Paintings, photographs, maps and the like are often hung on walls or otherwise displayed in order to enhance the appearance of the room and to appeal to the eye of the observer. However, these are of a flat, two-dimensional nature and do not necessarily stand out and immediately attract attention, particularly if the room is darkened or the lighting is not good. In my U.S. Pat. No. 5,226,725 an illuminated map device is described in which a panel or globe having cut-out lines following map contours is illuminated from behind so that the map will stand out in a darkened room.

SUMMARY OF THE INVENTION

It is an object of the present invention to provide a new and improved illuminated panel device.

According to one aspect of the present invention, an illuminated panel device is provided which comprises a flat panel of light transmitting material having a thickness of at least ¼ inch, the panel having a plurality of linear cut-outs extending along predetermined contours to form a selected pictorial representation, and at least one light source associated with the panel for directing light through the panel to illuminate the contours such that light is reflected from the edges of the contours and the pictorial representation stands out from the remainder of the panel.

This produces a three-dimensional type of effect, due to the light transmitting nature of the material and the thickness of the panel resulting in illumination and reflection of the light from the relatively thick contour edges to produce a depth effect in the illuminated edge.

Preferably, a light housing unit is secured along at least one edge of the panel and a light source is mounted in the unit to direct light through the edge of the panel into the panel material, where it is transmitted to the contour edges and reflected from those edges back out of the panel. The housing unit may be secured along a lower edge, upper edge, or side edge of the panel, or a lighting unit may extend around the entire periphery of the panel to provide peripheral lighting from all directions. Alternatively, a single light source may be secured anywhere along the edge of the panel to direct light into the panel material. The panel may have through bores drilled along one or more of its peripheral edges to receive a suitable strip light source for illuminating the panel.

The cut-out lines in the panel may be made by any suitable method, although they are preferably laser cut lines. The panel is preferably of acrylic material and may be up to 6 inches in thickness. Preferably, the panel has both cut-out lines to form linear peripheral edges of larger features in the pictorial representation, as well as cut-out, non-linear openings representing smaller features of the pictorial representation.

The pictorial representation may be a map, a picture such as a sunset, a figure of a person or animal, a mountain scene, a pattern or any other artistic representation which can be represented by a line drawing. When the panel is lit from any point in the panel, the light will travel through the panel and illuminate all of the cut-out contour edges, providing a very attractive appearance, particularly in a darkened room.

Each continuous linear cut-out will have at least one bridge in its length where the material is not cut, and in most cases a plurality of bridges or gaps are provided at spaced intervals in each linear cut-out, in order to maintain the integrity of the panel so that no parts will be completely separated from the remainder of the panel.

BRIEF DESCRIPTION OF THE DRAWINGS

The present invention will be better understood from the following detailed description of some preferred embodiments of the invention, taken in conjunction with the accompanying drawings, in which like reference numerals refer to like parts, and in which.

DESCRIPTION OF THE PREFERRED EMBODIMENTS

FIGS. 1–4 of the drawings illustrate an illuminated panel device 10 according to a first embodiment of the invention. The device 10 basically comprises a flat rectangular panel 12 of light transmitting material which may be transparent or translucent, such as acrylic plexiglass or similar materials, on which a selected pictorial representation 14 has been cut in the form of a series of cut-out lines 16 extending along the contours of the representation. In the illustrated embodiment, the representation is in the form of a map, but it will be understood that other artistic representations may be displayed in an equivalent manner, for example scenic pictures such as skylines, mountains and so on, with the only limitation being that the representation must be capable of reduction to a line drawing.

Figure 3:
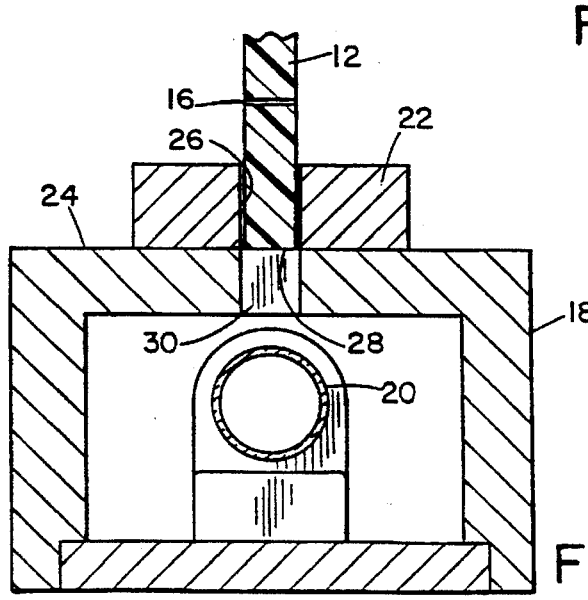
FIG. 3 is an enlarged sectional view taken on line 3—3 of FIG. 1.

The panel 12 is supported in base housing 18 which is a hollow rectangular housing containing a suitable light source 20, as illustrated in FIG. 3. A raised ridge or strip 22 extends along the upper wall 24 of the housing, with a channel or groove 26 running along the strip 22 for receiving the lower edge 28 of the panel to support the panel in an upright orientation, as illustrated in FIG. 3. A slit-like transparent window or opening 30 is provided in upper wall 24 in alignment with and extending along the length of channel 26 for allowing light to be transmitted through the upper wall 24 to base light the panel 12.

The light source 20 may be a strip light as illustrated, or any other type of light source such as one or more light bulbs, a fiber-optic light source, or the like, and may be white or colored light. The light source is connected to a suitable power supply which may be an internal battery. Alternatively, a power input for connection to the mains power supply is provided.

Figure 4:
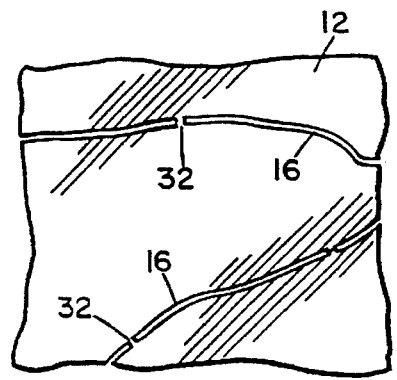
FIG. 4 is an enlargement of a portion of the illuminated panel, showing the cutting lines and connecting bridges.

Each pair of adjacent cut-out lines 16 extending along a contour is separated by a gap or bridge 32 where the panel material is uncut, as illustrated in FIG. 4. Normally, a series of spaced lines 16 separated by bridges 32 will be provided along each continuous contour of the representation. The purpose of bridges 32 is to maintain the integrity of the panel and ensure that any parts which are completely surrounded by cut-out lines will still be secured to the remainder of the panel, for example the continents 34 illustrated in FIG. 1. The number of gaps or bridges in each line will be dependent on the complexity of the contour and the size of the area surrounded, with more complex contours generally needing a larger number of gaps and smaller areas generally needing fewer gaps. Small cut out areas or openings 36 may also be provided in the panel if the representation includes features which are too small to be formed by a peripheral line, for example small lakes or islands on a map. The panel is preferably at least ¼ inch thick acrylic or plexiglass material, which is easy to laser cut and relatively durable, and may be up to 6 inches thick. The width of the cut is preferably of the order of 0.001 to 0.003 inches.

Figure 1:
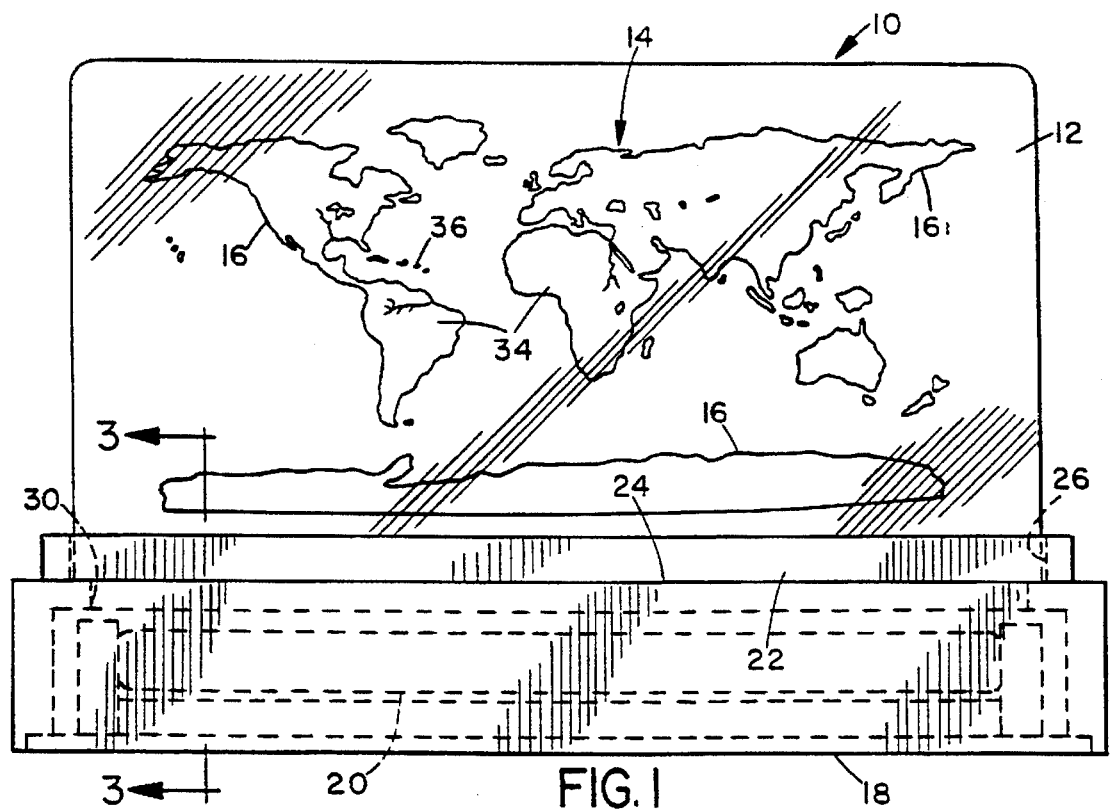
FIG. 1 is a front elevation view of the illuminated panel unit according to a preferred embodiment of the invention.
Figure 2:
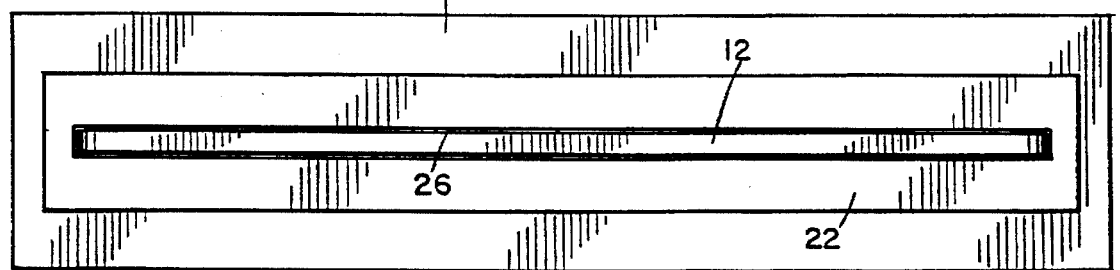
FIG. 2 is a top plan view of the unit.

When the panel is supported in the base housing as illustrated in FIG. 1, it will be base-lit by the light source. Light will be transmitted upwardly through the panel and will be reflected from the edges of the cut lines, tending to illuminate all of the edge contours so that they stand out in a dramatic and attractive manner from the remainder of the panel.

Because the panel is relatively thick, having a thickness of at least ¼ inch, the lighting effect produced will be quite dramatic and will make the pictorial representation stand out from the remainder of the panel in a very attractive manner. Light transmitted from the light source through the panel material will be reflected from the relatively thick edges of the cut-outs, so that the entire edge is illuminated and will produce a depth or three dimensional effect to the picture, rather than a flat, two-dimensional picture. A thickness of at least ¼ inch will enhance this effect.

In the first embodiment described above, a base lighting unit is provided. However, in practice the same effect may be produced by illuminating the panel from any direction, by means of a light source at any position on the panel. Depending on how the panel is to be displayed, a lighting unit may alternatively be secured to the upper edge or either or both side edges of the panel, or a peripheral lighting unit may extend along the entire periphery of the panel. FIGS. 5–11 illustrate some alternative embodiments with different lighting arrangements and different mounting or support arrangements for the panel 12.

Figure 5:
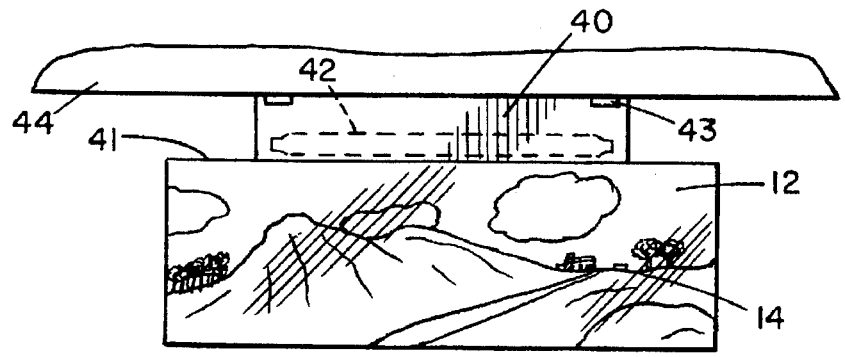
FIG. 5 is a front elevation view of an illuminated panel unit with a modified lighting unit.

FIG. 5 illustrates a panel 12 which is identical to panel 12 of the first embodiment and which is provided with any selected pictorial representation 14, such as a map, scenery, figures of one or more people or animals, patterns, and so on. However, in this embodiment, the base lighting unit 18 is replaced with a lighting unit 40 which is secured across the upper edge 41 of the panel. Lighting unit contains a suitable light source such as a strip light 42 for transmitting light into the panel through the upper edge 41. The unit 40 may be secured to the panel by any suitable means, such as support bolts extending through drilled holes in the panel adjacent edge 41. A window or opening will be provided in the unit or housing along edge 41 to direct light into the panel, similar to window 30 in the first embodiment. Suitable fixtures 43 are provided for securing unit 40 to an overhead support such as ceiling 44, so that the panel is suspended from the ceiling to provide an attractive display.

Figure 6:
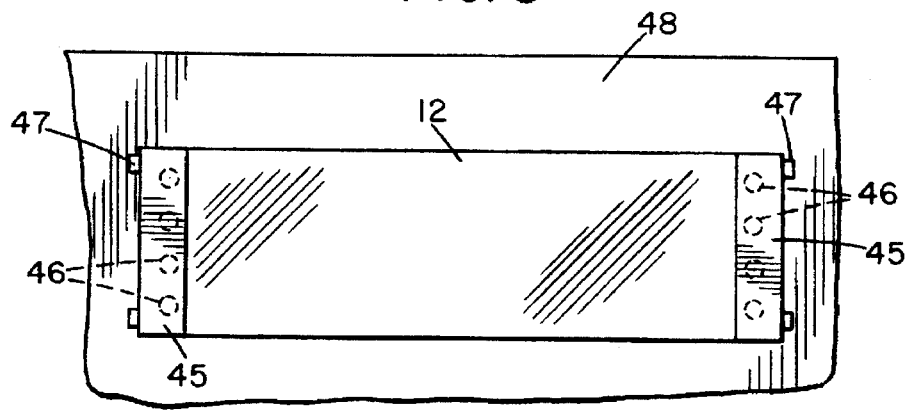
FIG. 6 is a front elevation view illustrating another modified lighting unit for the panel.

Another alternative lighting arrangement for panel 12 is illustrated in FIG. 6. Panel 12 will include a pictorial representation as in the previous embodiments and will be identical to the panels of the previous embodiments apart form the lighting and mounting arrangement. In this alternative, side lighting units 45 are secured along each side edge of the panel via bolts or the like (not illustrated). Each lighting unit comprises an outer housing containing a suitable light source such as a series of light bulbs 46, a strip light, or the like, and has a window facing the panel edge for directing light into the panel from opposite directions. A battery power source for the light source may be provided in each housing, or suitable power cables may extend out of the two units for connection to a mains power supply. Each unit 45 has mounting fixtures 47 for mounting the panel on a wall 48 via bolts or the like.

Figure 7:
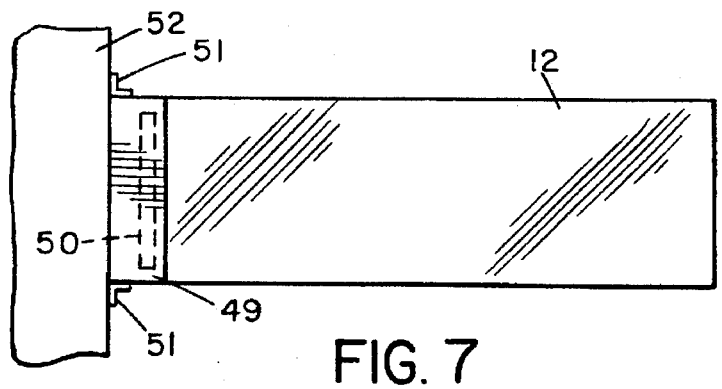
FIG. 7 illustrates another modified lighting unit and wall mounting for the panel.

Instead of lighting units 45 along both side edges, a lighting unit 49 may be mounted along one side edge only of the panel 12, as illustrated in FIG. 7. Unit 49 contains a suitable light source 50 such as a strip light, separate light bulbs, or the like, and has fixtures such as angle brackets 51 for securing the unit to a wall 52 so that the panel projects outwardly as illustrated in FIG. 7 and can be viewed from both sides. Unit 49 comprises a housing for the light source 50 with a window or opening facing the side edge of the panel for directing light into the panel.

Figure 8:
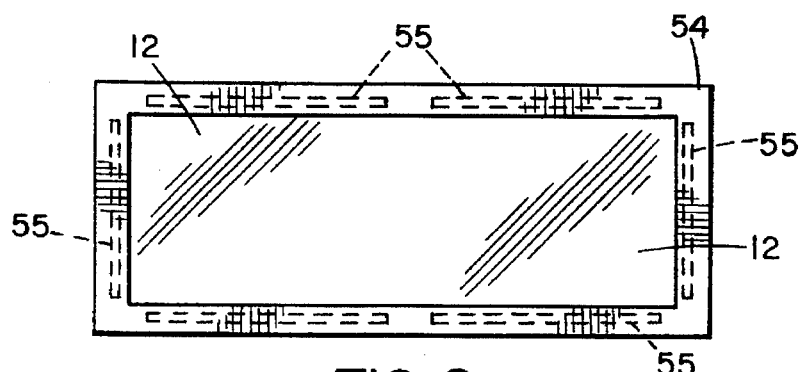
FIG. 8 is a front elevation view illustrating an illuminated panel with peripheral lighting.

In the alternative of FIG. 8, the panel 12 has a peripheral, hollow frame unit 54 extending around the entire periphery of the panel. The frame unit 54 may be secured to the edge of the panel by means of adhesive, bolts or the like. Preferably, the frame unit has a suitable inwardly facing groove for receiving the peripheral edge of the panel in the same way as a picture frame. Suitable light sources such as a series of strip lights 55 are mounted in the hollow frame so as to direct light into all of the peripheral edges of the panel. The lights 55 may be connected to a battery power source also mounted in the frame, or may be connected to a suitable power cable for connection to an external power source. Illumination of the panel from all directions will provide an enhanced illumination effect. The pictorial representation on panel 12 will be illuminated from all directions with this arrangement. Instead of strip lights 55, a series of spaced light bulbs may be provided in the frame along the perimeter of the panel. The panel may be wall mounted in a similar manner to a picture or painting.

Figure 9:
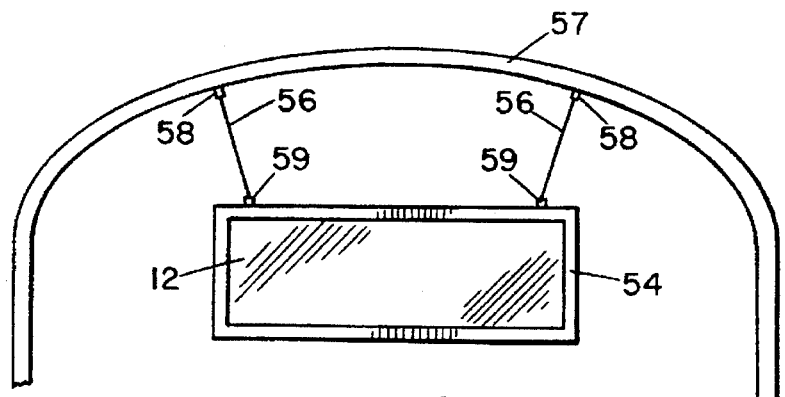
FIG. 9 is a front elevation view illustrating a suspension system for the panel of FIG. 8.

The panel may alternatively be suspended by support wires or cables 56 from an archway 57 or ceiling, as illustrated in FIG. 9. The cables 56 are suitably bolted to the archway 57 via ceiling bolt fixtures 58, and may also be secured via bolts 59 to the peripheral lighting frame unit 54, which may be the same as in FIG. 8. This acts to suspend the panel so that it can be viewed from both sides and provides an attractive, eye-catching appearance when illuminated.

Figure 10:
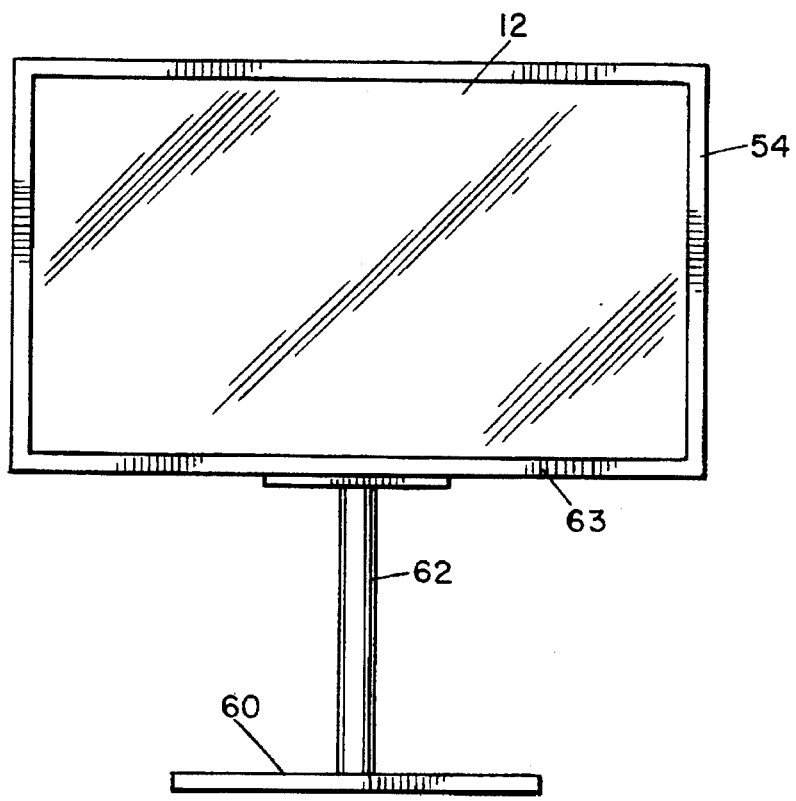
FIG. 10 is a front elevation view illustrating another panel mounting arrangement.

The panel 12 may be of any desired size or shape, and may be of billboard-like dimensions, for example for use in outdoor areas to provide an attractive illuminated sign at night. FIG. 10 illustrates an alternative panel support arrangement in which the panel 12 is relatively large and has a surrounding peripheral frame 54 as in FIG. 8 containing suitable light sources for illuminating the sign. The panel is supported in an elevated position above the ground by means of a support base 60 which may be placed on the ground at any desired location, and a support post 62 projecting upwardly from the center of base 60 and secured to the lower member 63 of peripheral frame unit 54 in any suitable manner. The panel may be as large as a billboard and the illuminated pictorial display will stand out in darkened conditions. The pictorial display may comprise advertising, informational signs, or any other desired outdoor display.

In each of the above embodiments, the panel is of acrylic material in which a desired display is cut as described above in connection with the first embodiment. The acrylic may be clear or transparent, or may be tinted in any desired color to provide alternative lighting effects. The panel may be illuminated by any suitable light source such as incandescent lights, fluorescent lights, halogen lights, fiber-optic lighting, and the like. The panel may be illuminated from one or more points along one or more edges of the panel, or may be back lit. The light sources may be white or colored light, and different color light sources may be provided in the same lighting unit to provide different effects, for example so that different panel regions are illuminated in different colors.

Figure 11:
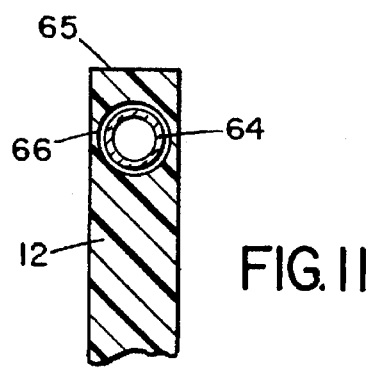
FIG. 11 is an enlarged, partial sectional view along an edge of a modified panel and lighting unit.

In each of the previous embodiments, the panel is illuminated via one or more light sources contained in a light unit or housing secured along one or more edges of the panel. However, the panel is sufficiently thick for a strip light source to be actually embedded in the panel itself, if desired. FIG. 11 illustrates another alternative lighting arrangement in which a bore 64 is drilled adjacent one edge 65 of panel 12, and a light source 66 such as a strip light or fiber-optic light is mounted in the bore 64 to direct light into the panel and illuminate the edges of a display cut in the panel material as in the previous embodiments. Light sources 66 may be mounted in bores 64 extending along one or more edges of the panel, and the panel may be mounted for display in any suitable manner, including all of the alternative arrangements illustrated in the previous embodiments. Wall mounting or ceiling suspension fixtures may be secured directly to the panel via bolts or the like extending through transverse holes drilled at appropriate locations adjacent the panel edges.

The panels of this invention provide a very unique effect. The width of the cut it so narrow that the viewer cannot see its width dimension, and is not aware that the material is cut at all. The cutting technique permits fine detail to be provided in a three-dimensional illuminated display. This provides an intriguing effect to the viewer.

The panel design itself may be made in any suitable manner, such as a laser cutting process as described in copending application No. 07/874,118 referred to above, or any alternative cutting technique such as with a high pressure, water cutting device.

Although some preferred embodiments of the invention have been described above by way of example only, it will be understood by those skilled in the field that modifications may be made to the disclosed embodiments without departing from the scope of the invention, which is defined by the appended claims.

I claim:

1. An illuminated panel device, comprising:
   a flat panel of light-transmitting material having a peripheral edge and defining a plane;
   the panel having a plurality of cut-out lines in a predetermined arrangement to form peripheral edges of large features in a selected pictorial representation and a plurality of cut-out, non-linear openings having edges representing smaller features of the pictorial representation; and
   a lighting unit secured to the peripheral edge of the panel, the unit having at least one light source transmitting light through the panel in a direction lying in the plane of the panel and towards the edges of said cut-out lines and non-linear openings, whereby light is reflected from said edges and the pictorial representation is illuminated.

2. The device as claimed in claim 1, wherein the panel has peripheral upper, side and lower edges, and the lighting unit comprises an outer housing in which the light source is mounted, the housing having a wall with a window opening allowing light from the light source to be transmitted through the panel.

3. The device as claimed in claim 2, wherein the light source is secured along the upper edge of the panel.

4. The device as claimed in claim 2, wherein the light source is secured along one side edge of the panel.

5. The device as claimed in claim 2, wherein the lighting unit includes two light sources, one light source being secured along one side edge of the panel and an other light source being secured along an opposite side edge of the panel.

6. The device as claimed in claim 1, wherein the lighting unit comprises a peripheral frame extending around an entire periphery of the panel, the frame being hollow and having a series of light sources extending around the periphery of the panel directing light into the panel from all directions.

7. The device as claimed in claim 1, wherein the panel has peripheral upper, opposite side, and lower edges, and a bore is drilled through the panel material parallel to and adjacent at least one edge of the panel, the light source being mounted in said bore.

8. The device as claimed in claim 1, including wall mounting fixtures for mounting said panel on a wall.

9. The device as claimed in claim 1, including overhead suspension fixtures secured to said lighting unit for suspending the panel and lighting unit from an overhead support.

10. The device as claimed in claim 1, including a base support for supporting the panel in an upright orientation above a horizontal support surface.

11. An illuminated panel device, comprising:
    a flat panel of light transmitting material having a peripheral edge and defining a plane;
    the panel having a plurality of cut-out lines in a predetermined arrangement to form contour edges defining a selected pictorial representation;
    a lighting unit secured to the peripheral edge of the panel, the unit having at least one light source transmitting light through the panel in a direction lying in the plane of the panel towards the contour edges, whereby the light is reflected from the contour edges and the pictorial representation are illuminated; and
    the pictorial representation comprising a map having selected topographical features having contours and the cut-out lines extend along the contours of the selected topographical features.

* * * * *